United States Patent [19]

Hill

[11] Patent Number: 4,621,942
[45] Date of Patent: Nov. 11, 1986

[54] GRASS PAVING STRUCTURE

[75] Inventor: Ronald F. Hill, Huntington Beach, Calif.

[73] Assignee: Bartron Corporation, Laguna Hills, Calif.

[21] Appl. No.: 655,504

[22] Filed: Sep. 27, 1984

[51] Int. Cl.[4] .......................... E01C 5/20; E01C 15/00
[52] U.S. Cl. ........................................ 404/41; 404/36; 404/35; 404/42
[58] Field of Search ........................ 404/34, 35, 36, 41, 404/42, 70; 52/180, 181, 318, 448, 581, 583, 660, 663

[56] References Cited

U.S. PATENT DOCUMENTS

| | | |
|---|---|---|
| 957 | 5/1860 | Titus et al. .......................... 52/581 |
| 70,076 | 10/1867 | Dean . |
| 1,765,652 | 6/1930 | Burgess . |
| 1,778,927 | 10/1930 | Wright .............................. 404/41 |
| 1,905,176 | 4/1933 | Kieckhefer . |
| 1,974,279 | 9/1934 | Jones . |
| 2,443,589 | 6/1948 | Bates et al. . |
| 3,267,823 | 8/1966 | MacRae ............................ 404/41 |
| 3,802,790 | 4/1974 | Blackburn ......................... 404/82 |
| 3,909,996 | 10/1975 | Ettlinger, Jr. et al. ............ 52/177 |
| 3,923,410 | 12/1975 | Jordan et al. ..................... 404/41 |
| 3,960,375 | 6/1976 | Bibi-Roubi et al. .............. 404/35 |
| 4,111,585 | 9/1978 | Mascaro ........................... 404/36 |
| 4,118,892 | 10/1978 | Nakamura et al. ............... 47/66 |

FOREIGN PATENT DOCUMENTS 2220179  3/1973  France ................................. 47/9

OTHER PUBLICATIONS

Geoblock Landscaping System by Presto Products, Inc. Concrete Masonry Grid Pavers for Erosion Control by National Concrete Masonry Association.

*Primary Examiner*—Stephen J. Novosad
*Assistant Examiner*—Matthew Smith
*Attorney, Agent, or Firm*—Price, Gess & Ubell

[57] ABSTRACT

A grass paving unit of honeycomb cell construction with side walls and underlying base surfaces contoured to provide complementary interlocking surfaces and cleat members to add positional stability to the units.

7 Claims, 3 Drawing Figures

4,621,942

GRASS PAVING STRUCTURE

BACKGROUND OF THE INVENTION

1. Field of the Invention

The subject invention relates to grass paving structures, and more particularly to a grass paving structure having improved structural and interconnection features.

2. Brief Description of the Prior Art

In the prior art, grass paving devices are known. These generally provide individual square units, each unit containing a honeycomb or square cells wherein grass or other suitable plants are grown. Such paving units are typically laid out to provide grass covered roads in golf courses, parking lots, emergency access roads and similar areas, eliminating the less aesthetically pleasing asphalt or other nongrass pavements known in the prior art.

Prior art grass paving units have employed awkward plastic tabs or cumbersome sliding mechanisms for use in attaching individual units together to form an interlocked paving system. As a result, assembly is complicated and assembly time lengthened. Such units have also been subject to slippage with respect to the underlying ground surface.

SUMMARY OF THE INVENTION

It is therefore an object of the invention to provide an improved grass paving unit.

It is another object of the invention to provide an improved system which permits interlocking of paving units, while maintaining a degree of independent suspension sufficient to ensure a continuous flow over variable terrain.

It is another object of the invention to provide additional positional stability to grass paver units.

It is another object of the invention to provide a grass paver unit with reduced assembly time and cost.

The grass paver of the subject invention includes a honeycomb cell structure with side walls arranged to interlock with adjacent units and bottom cleats to prevent surface slippage. One pair of side walls provides a complementary sawtoothed structure and a base providing alternating circular pads. The second pair of side walls provide complementary half-hexagonal surfaces with the base providing similarly shaped pads.

DETAILED DESCRIPTION OF THE PREFERRED EMBODIMENT

Figure 1:
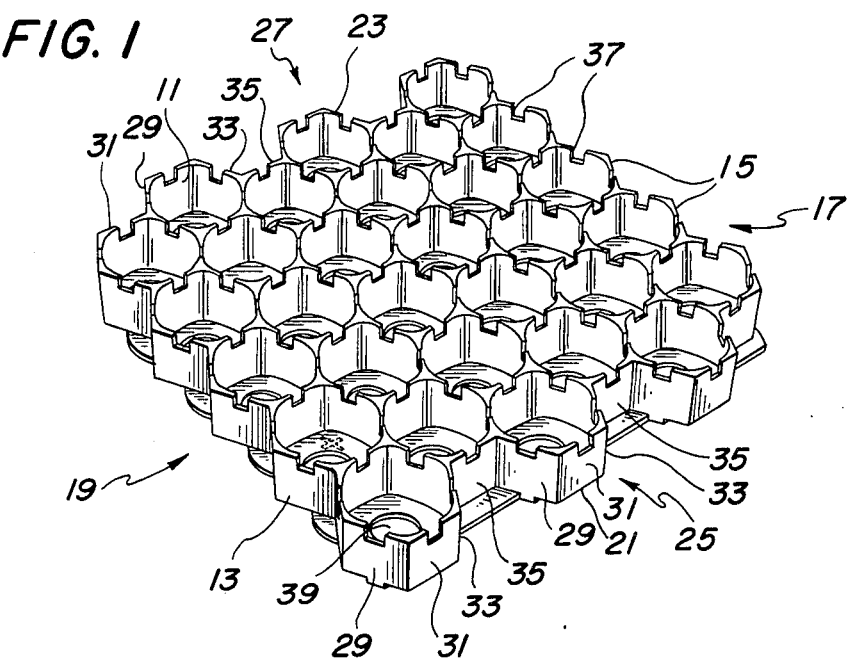
FIG. 1 is a perspective view of a cell unit according to the preferred embodiment.

As illustrated in FIG. 1, the preferred embodiment includes a generally square unit of integrally formed or "nested" substantially regular hexagonal cells 11. Each unit may be, for example, about one foot square and formed of a high density polyethylene wth U.V. (ultraviolet) inhibitors. The hexagonal structure yields sawtoothed side walls 13, 15 on first and second sides 17, 19 of the unit's perimeter and interconnected half-hexagonal side walls 21, 23 on third and fourth sides 25, 27.

Each half-hexagonal wall includes sides 29, 31, 33 interconnected by one side 35 of an adjacent hexagon 11.

Each hexagonal cell 11 includes notches 37 in the perimeter of the cell 11 and circular openings 39 in the bottom of each cell 11. The notches 37 permit roots, rhizomes and stolons to travel from cell to cell, creating an interlocking effect. The circular openings 39 permit movement of water, air and nutrients from grass stems to the subsurface root area.

Figure 2:
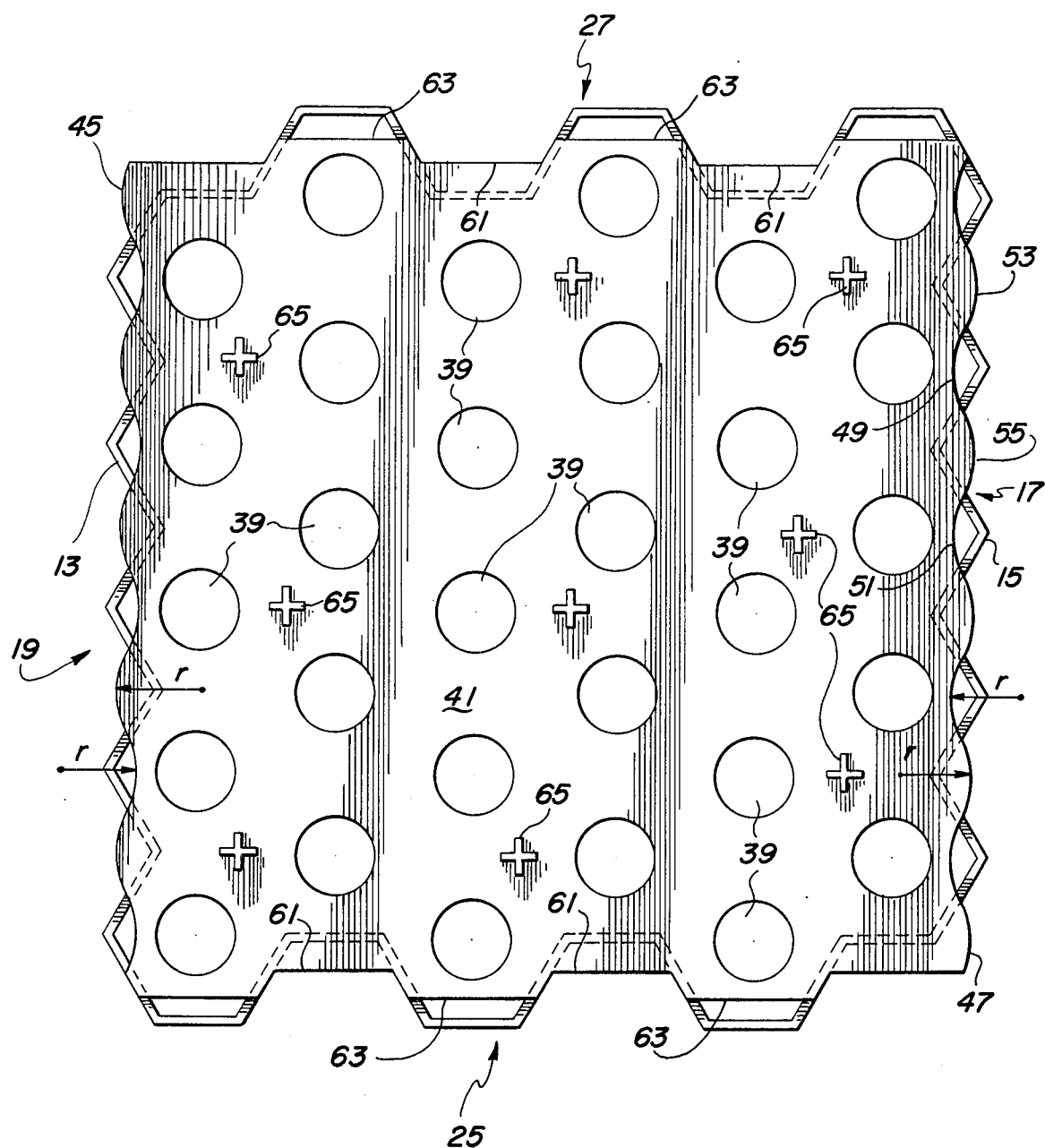
FIG. 2 is a bottom surface view of the preferred embodiment.

The hexagonal cells 11 are integrally formed with a base 41 whose contours are best shown in the bottom view of FIG. 2. The base 41 includes oscillating contours 45, 47 on the first and second sides 17, 19 of the structure. The contours 45, 47 are preferably formed of a common radius "r", for example, 2-3/16 inches. On the first side 17, the radius is such that the contour 47 curves in where the sawtooth 15 juts out, e.g., at points 49, 51, and curves out where the sawtooth recedes, e.g., at points 53, 55. The relation of the overlying sawtooth 13 and underlying curved edges of the second side 19 are the same as the first side 17. However, the hexagonal structure is terminated such that the second side 19 is complementary to the first side 17; that is, where the surfaces of the first side 17 jut out, those of the second side 19 recede. In this manner, the second side 19 of a second unit constructed according to the preferred embodiment form an interlocking relationship with the first side 17 of a first unit.

Along the third and fourth sides 25, 27, the base 41 is formed to extend beyond the recessions of the overlying hexagonal cell 11 and to recede slightly from the fullest extension of those cells to create a complementary interlocking lip structure. The recessed edges 61 of the base 41 and the extended edges 63 of the base 41 form a periodic shape, which parallels that of the overlying cells 11 but does not extend or recede to the extent of the overlying structure. The hexagonal structure is again terminated at a row which results in the third side 25 being complementary to the fourth side 27, facilitating interlocking of adjacent units constructed according to the preferred embodiment.

Figure 3:
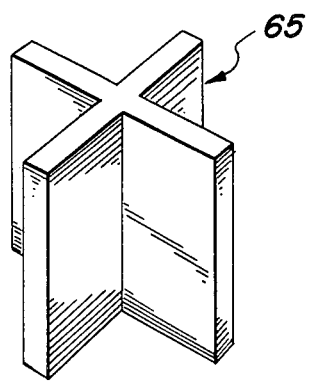
FIG. 3 is a perspective detail of a cleat according to the preferred embodiment.

Finally, cleats (FIG. 3) are provided in the base 11, resulting in additional positional stability for the unit. Exemplary locations 65 for such cleats are shown by crosses in FIG. 2.

The preferred embodiment provides an interlocking structure of improved strength, which is faster to assemble and install, saving material and handling costs. Using a wall thickness of 0.10 inches for the cell walls, support pads and bottom yields a structure which will support vehicular traffic up to 30 tons. The structure prevents soil compaction, and the planted surface actually becomes stronger as the turf grass matures.

Those skilled in the art will appreciate that the just-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. A grass paving structure comprising:
   a plurality of hexagonal cells nested to form a single unit having a first, second, third and fourth side;
   the first and second sides of the nested cell unit forming complementary sawtoothed walls;
   the third and fourth sides of the nested cell unit forming complementary half-hexagonal walls, and an integrally formed base supporting the nested cell unit having a first and second edge underlying said first and second sides, respectively, said first and second edges formed as complementary arcuate undulations that extend beyond the recessions of the first and second sides, and third and fourth edges underlying said third and fourth sides, respectively, said third and fourth edges formed as complementary half-hexagonal periodic shapes that extend beyond the recessions of the third and fourth walls; whereby when one grass paving structure is positioned adjacent to another, they interlock and support each other in one plane and support each other in another plane.

2. The grass paving structure of claim 1 further including a plurality of cleats formed on the bottom side of said base.

3. The grass paving structure of claim 1 wherein said base includes a circular opening beneath each hexagonal cell.

4. The grass paving structure of claim 3 wherein the walls of each hexagonal cell have a notch in the upper edge thereof.

5. The grass paving structure of claim 1 wherein each said arcuate undulations comprises alternating curves of the same arc and radius.

6. A hexagonal cell structure for installation with an identically formed structure, the hexagonal cell structure having sawtooth sides along first respective opposite sides and a series of spaced apart, half hexagons on second respective opposite sides; and a base means underlying said hexagonal cell structure;

said base means, along first respective opposite sides being contoured as complementary half-hexagonal periodic shapes such that a portion of each half-hexagon extends beyond said base means, thereby providing a half hexagonal extension, and such that said base means provides a surface means between each adjacent half-hexagon for receiving an overlying half hexagonal extension of said identically formed structure;

said base means, along second respective opposite sides, being contoured as complementary arcuate undulations such that a portion of each sawtooth extends beyond said base means, thereby providing a sawtooth extension, and such that said base means provides a surface means between each adjacent sawtooth for receiving an overlying sawtooth extension of said identically formed structure; whereby when one hexagonal cell structure is positioned adjacent to another, they interlock and support each other in one plane and support each other in another plane.

7. A hexagonal cell structure for installation with an identically formed structure, the hexagonal cell structure having sawtooth sides along first respective opposite sides and a series of spaced apart, half hexagons on second respective opposite sides; and a base member underlying said hexagonal cell structure;

said base member, along first respective opposite sides being contoured such that a portion of each half-hexagon extends beyond said base member, thereby providing a half hexagonal extension, and such that said base member provides complementary half-hexagonal periodic shapes for receiving overlying half hexagonal extensions of said identically formed structure;

said base member, along second respective opposite sides, being contoured such that a portion of each sawtooth extends beyond said base member, thereby providing a sawtooth extension, and such that said base member provides complementary arcuate undulations for receiving overlying sawtooth extensions of said identically formed structure; whereby when one hexagonal cell structure is positioned adjacent to another, they interlock and support each other in one plane and support each other in another plane.

* * * * *